D. J. MARTIN.
TIRE CHAIN.
APPLICATION FILED JULY 15, 1911.
1,059,182.
Patented Apr. 15, 1913.
2 SHEETS—SHEET 1.
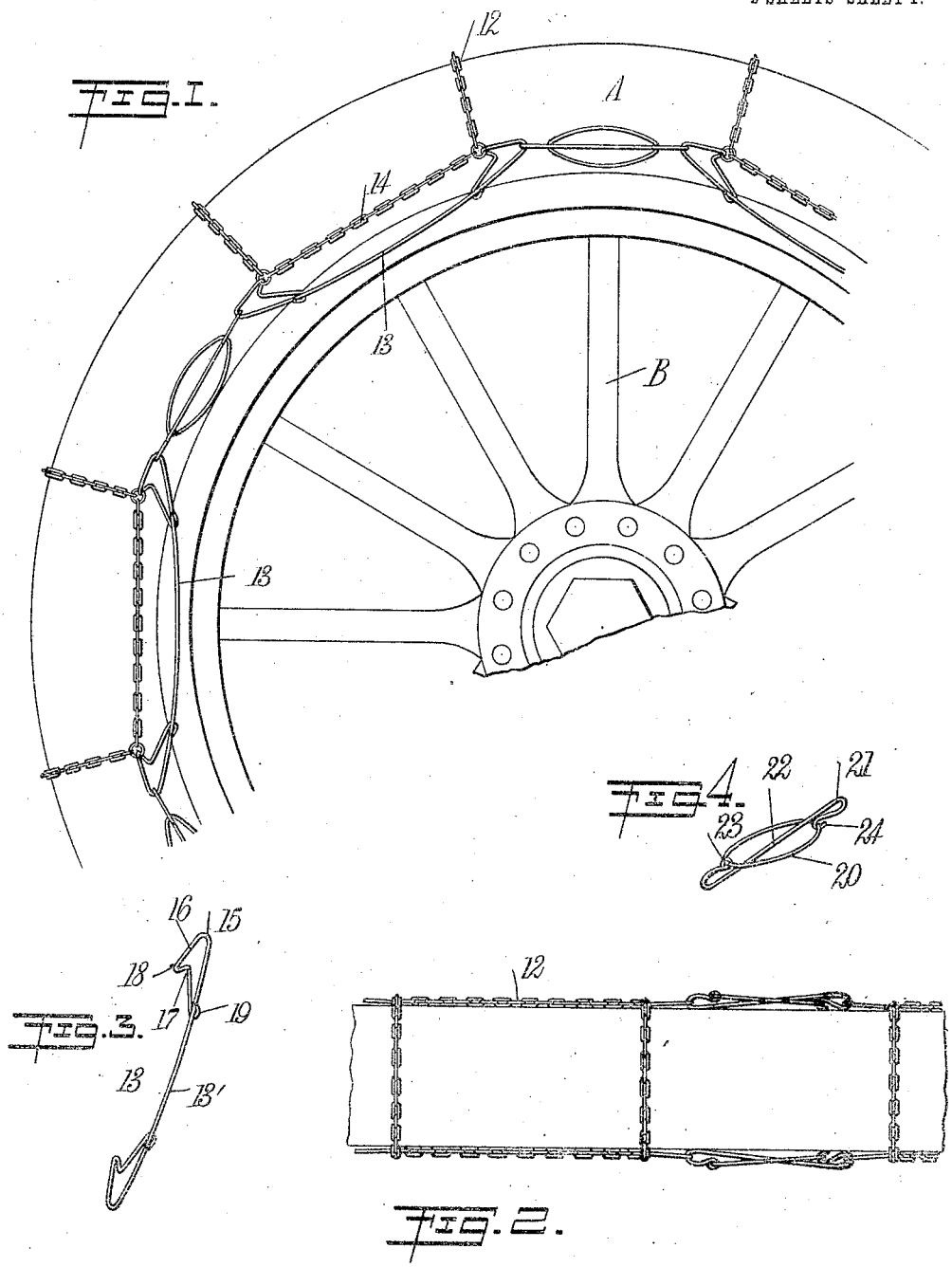
WITNESSES
G. Robert Thomas
H. S. Orton.
INVENTOR
Douglas J. Martin
BY Munn & Co.
ATTORNEYS D. J. MARTIN.
TIRE CHAIN.
APPLICATION FILED JULY 15, 1911.
1,059,182.
Patented Apr. 15, 1913.
2 SHEETS—SHEET 2.
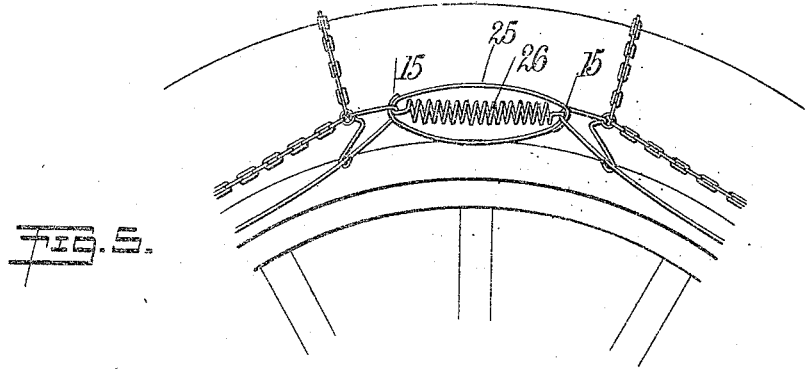
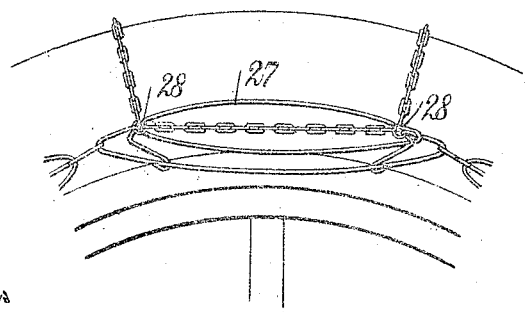
WITNESSES
G. Robert Thomas
W. S. Orton
INVENTOR
Douglas J. Martin
BY
Munn & Co
ATTORNEYS

UNITED STATES PATENT OFFICE.

DOUGLAS J. MARTIN, OF NEW YORK, N. Y.

TIRE-CHAIN.

1,059,182.  Specification of Letters Patent.  Patented Apr. 15, 1913.

Application filed July 15, 1911. Serial No. 638,634.

*To all whom it may concern:*

Be it known that I, DOUGLAS J. MARTIN, a citizen of the United States, and a resident of the city of New York, borough of Manhattan, in the county and State of New York, have invented a new and Improved Tire-Chain, of which the following is a full, clear, and exact description.

My invention relates to a new form of tire chain or anti-skid device to be positioned on automobile and other tires.

An object of my invention is to provide a chain construction which will be retained on the wheel even after portions of the tread portion have been worn away and separated.

A further object of my invention is to provide a resilient tension between the several members of the chain construction.

I attain the above outlined objects by disposing a series of open endless chains about the tire and extending over the tread portion thereof.

With the above and other objects in view as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a side elevation of a fragmentary portion of a wheel showing a preferred embodiment of my invention attached thereto; Fig. 2 is a plan view looking down upon a portion of a tire with the invention applied thereto; Fig. 3 is a perspective view of an auxiliary chain clip; Fig. 4 is a perspective view of a connecting spring link; Fig. 5 is a view similar to Fig. 1 but showing a modified form of spring connecting link; and Fig. 6 is a view similar to Fig. 5, showing a modification of the connecting link.

In the several figures I have shown spaced apart on the tire A of an automobile wheel B, a series of open endless chains 12, said chains being arranged rectangular in plan, as shown more particularly in Fig. 2, crossing transverse of the tread portion of the wheel and extending inwardly on both sides of the tire. In order to maintain the chains in their spaced-apart position about the tire, and at the same time to prevent the entire chain construction from falling off the wheel when parts of the chains are worn away, all of the chains are connected by means of chain clips.

Described more in detail, the chain clips 13 comprise a slightly arched portion or rod 13' extending substantially parallel with and slightly offset from the portion 14 of the chain 12 that lies flat against the side of the tire. The end of each of the arched portions 13 is bent back upon itself, to form a loop 15, which bent back portion 16 is again bent into a V 17 between the portions 13 and 16 in order to form a chain-engaging loop 18. The end of the member is bent back upon itself to form an eye 19 encircling the arched portion 13 some distance from the loop 15. This chain clip and chain construction is common to all of the embodiments here disclosed.

The loop 15 of one chain clip projects toward and is spaced some distance from the loop 15 attached to the next adjacent chain. Bridging this space and fastening the two clips together, is a connecting link such as is shown in Figs. 4 and 5.

As shown in Fig. 4, the connecting link comprises a resilient elliptical ring 20, extending diagonally through which ring is a pin 21, both ends of which are bent back upon the central portion 22 on opposite sides of the same, one end being formed into an eye 23 encircling the elliptical ring at its major axis, the opposite end of which pin is bent into an S-shaped hook 24 adapted to engage the ring at a point opposite the point 23.

By the above outlined construction it is possible to compress the sides of the ring, to elongate the same, freeing it from the hook 24. Then threading the pin 22 through the loop 15 on one side and through the loop 15 on the adjacent side, looping the ring 20 over the hook 24, and releasing the tension on the side of the ring, the ring will spring into its normal position, thereby holding the chain clip 13 of one chain resiliently connected to the chain clip 13 of the next adjacent chain.

In place of the connection disclosed in Fig. 4, an elliptical spring ring 25, shown in Fig. 5, may be used. This ring is formed of a single piece of metal, the central portion of which is wound into a cylindrical spiral spring 26, the opposite ends of which are bent outwardly in opposite transverse directions, to form the elliptical loop or ring 25. In making use of either of these connections, it may be desired to further reinforce the portion 14 of the chain 12, so as to prevent the same from flying loose from the tire in case of a break or wearing away of the parts, and this is obtained by threading the elliptical spring 27, as shown in Fig. 6, through the corner eyes 28 formed at the change of direction of the parts of the chain on each side of the tire.

It is to be understood that sections of the chain 14 and its attached clips 13' may be removed without removing the entire device and a new section of chain and clips inserted in place thereof.

Having thus described my invention, I claim as new and desire to secure by Letters Patent:

1. In an anti-skid device, a series of spaced-apart open endless chains disposed about the tire of a wheel, means for retaining each chain in open position, said means comprising closed elliptical springs passing through links of the chain on each side of the tire, and means passing through said links of the chain and connecting the chain with the next adjacent chain.

2. A clip adapted to be used in a chain anti-skid device to maintain the chain in open position, comprising an arched portion, each end of which is bent back upon itself to form a loop, and again bent back upon itself to form a second loop, each end formed into an eye encircling the arched portion.

3. In an anti-skid device, a series of open, rectangular, endless chains spaced apart about the periphery of a tire, a chain clip disposed on each side of the tire between adjacent chains, and a pair of spring tension devices for each chain disposed on opposite sides of the tire, each of said devices connecting, on each side of the tire, the chain clip with the adjacent corner of the next adjacent chain, and connecting the chain with the chain clips on each side of the chain on one side of the tire.

4. In an anti-skid device for tires, a series of endless, substantially rectangular, open, spaced apart chains disposed about the periphery of the tire, a series of resilient members, a pair for each chain, disposed on opposite sides of the same and on opposite sides of the tire, each member connecting the two corners of the chain on one side of the tire, and means connecting a member with the next adjacent member on the same side of the tire.

5. In an anti-skid device for tires, a series of endless, substantially rectangular, open, spaced apart chains disposed about the periphery of the tire, a series of resilient members, a pair for each chain, disposed on opposite sides of the same and on opposite sides of the tire, each member having a portion extending beyond its chain and bent back upon itself to form a loop, and means connecting adjacent loops of adjacent members on each side of the tire.

6. In an anti-skid device, the combination with an endless, open, substantially rectangular chain, of a pair of springs, each spring looped through a pair of adjacent corners of the chain and resiliently connecting the same.

7. In an anti-skid device, the combination with an endless, open, substantially rectangular chain, of a pair of springs, each spring looped through a pair of adjacent corners of the chain and resiliently connecting the same, and a clip also connecting the adjacent corners of said chain and affording means whereby the chain may be connected to an adjacent similarly constructed chain and springs.

8. In an anti-skid device, the combination with an endless, open, substantially rectangular chain, of a pair of elliptical springs, each spring looped through a pair of adjacent corners of the chain and resiliently connecting the same.

9. In an anti-skid device for tires, a series of open, endless chains disposed about the periphery of a tire, resilient devices attached to spaced apart points on the chains on opposite sides of the tire, maintaining said chains in open position, and means on each side of the tire connecting said first-mentioned resilient devices with the similar devices attached to the next adjacent chain.

10. In an anti-skid device for tires, a series of open, endless chains disposed about the periphery of a tire, resilient devices attached to spaced apart points on each chain on opposite sides of the tire, maintaining said chains in open position, and resilient means on each side of the tire connecting said first-mentioned devices with similar devices attached to the next adjacent chain.

11. In an anti-skid device for the tire of a wheel, endless chains disposed with portions extending across the tread of said tire and with other portions extending along the side of said tire, and a spring bar engaging opposite corners of each of said side portions to maintain the same in stretched position.

12. In an anti-skid device, an endless chain adapted to be placed in open position on the tire of a wheel, and a bar connecting spaced apart points on said chain, said bar having an outwardly arched portion, the opposite ends of which are bent back upon themselves to form loops to engage the chain.

13. In an anti-skid device, an endless chain adapted to be placed in open position on the tire of a wheel, and a bar connecting spaced apart points on said chain, said bar having an outwardly arched portion, the opposite ends of which are bent back upon themselves to form loops to engage the chain, the ends of said bar being bent to close the loop, to retain said chain in place relative to said bar.

14. In an anti-skid device for tires, an endless open chain adapted to be positioned across the tire of a wheel and having a substantially straight portion on each side of the tire, and a reinforcing resilient bar positioned on the side of the tire extending substantially parallel to and coextensive with the straight portion of the chain and gripping said chain at spaced-apart points thereof.

In testimony whereof I have signed my name to this specification in the presence of two subscribing witnesses.

DOUGLAS J. MARTIN.

Witnesses:
W. S. ORTON,
JOHN P. DAVIS.